(12) United States Patent
Bhatia

(10) Patent No.: US 11,880,316 B2
(45) Date of Patent: Jan. 23, 2024

(54) INPUT OUTPUT (IO) REQUEST HANDLING BASED ON TRACKING INFORMATION

(71) Applicant: VMWARE, INC., Palo Alto, CA (US)

(72) Inventor: Kashish Bhatia, Bangalore (IN)

(73) Assignee: VMware, Inc., Palo Alto, CA (US)

(\*) Notice: Subject to any disclaimer, the term of this patent is extended or adjusted under 35 U.S.C. 154(b) by 73 days.

(21) Appl. No.: 17/592,552

(22) Filed: Feb. 4, 2022

(65) Prior Publication Data

US 2023/0185741 A1 Jun. 15, 2023

(30) Foreign Application Priority Data

Dec. 8, 2021 (IN) .............................. 202141057092

(51) Int. Cl.
*G06F 13/16* (2006.01)

(52) U.S. Cl.
CPC .............................. *G06F 13/1668* (2013.01)

(58) Field of Classification Search
CPC .................................................. G06F 13/1668
USPC ........................................................ 710/107
See application file for complete search history.

(56) References Cited

U.S. PATENT DOCUMENTS

| | | | | |
|---|---|---|---|---|
| 10,037,157 | B1 * | 7/2018 | Koli | G06F 3/0665 |
| 10,430,335 | B2 * | 10/2019 | Rahme | G06F 12/0804 |
| 2007/0113020 | A1 * | 5/2007 | Gunna | G06F 9/3861 |
| | | | | 711/146 |
| 2012/0239882 | A1 * | 9/2012 | Sakai | G06F 3/0659 |
| | | | | 711/E12.017 |
| 2018/0173425 | A1 * | 6/2018 | Feng | G06F 12/0238 |
| 2018/0321963 | A1 * | 11/2018 | Amit | G06F 9/45558 |
| 2023/0032278 | A1 * | 2/2023 | Zhu | G06F 12/0864 |

\* cited by examiner

*Primary Examiner* — Christopher B Shin

(74) *Attorney, Agent, or Firm* — King Intellectual Asset Management

(57) ABSTRACT

Example methods and systems for input output (IO) request handling based on tracking information are described. One example may involve a computer system configuring, in a cache, a zero-filled logical memory page that is mappable to multiple logical block addresses of a virtual disk. In response to detecting a first IO request to perform zero writing at a logical block address, the computer system may store tracking information indicating that zero writing has been issued. In response to detecting a second IO request to perform a read at the logical block address, the computer system may determine that that zero writing has been issued for the logical block address based on the tracking information. The zero-filled logical memory page may be fetched from the cache to respond to the second IO request, thereby servicing the second IO request from the cache instead of the virtual disk.

21 Claims, 7 Drawing Sheets

INPUT OUTPUT (IO) REQUEST HANDLING BASED ON TRACKING INFORMATION

RELATED APPLICATION

Benefit is claimed under 35 U.S.C. 119(a)-(d) to Foreign Application Serial No. 202141057092 filed in India entitled "INPUT OUTPUT (IO) REQUEST HANDLING BASED ON TRACKING INFORMATION", on Dec. 08, 2021, by VMware, Inc., which is herein incorporated in its entirety by reference for all purposes.

BACKGROUND

Virtualization allows the abstraction and pooling of hardware resources to support virtual machines in a software-defined networking (SDN) environment, such as a software-defined data center (SDDC). For example, through server virtualization, virtual machines running different operating systems may be supported by the same physical machine (also referred to as a "host"). Each virtual machine is generally provisioned with virtual resources to run an operating system and applications. The virtual resources may include virtual central processing unit (CPU) resources, guest physical memory, virtual disk(s), etc. In practice, it is desirable to improve how virtual resources are used, including input output (IO) performance and efficiency.

DETAILED DESCRIPTION

Figure 1:
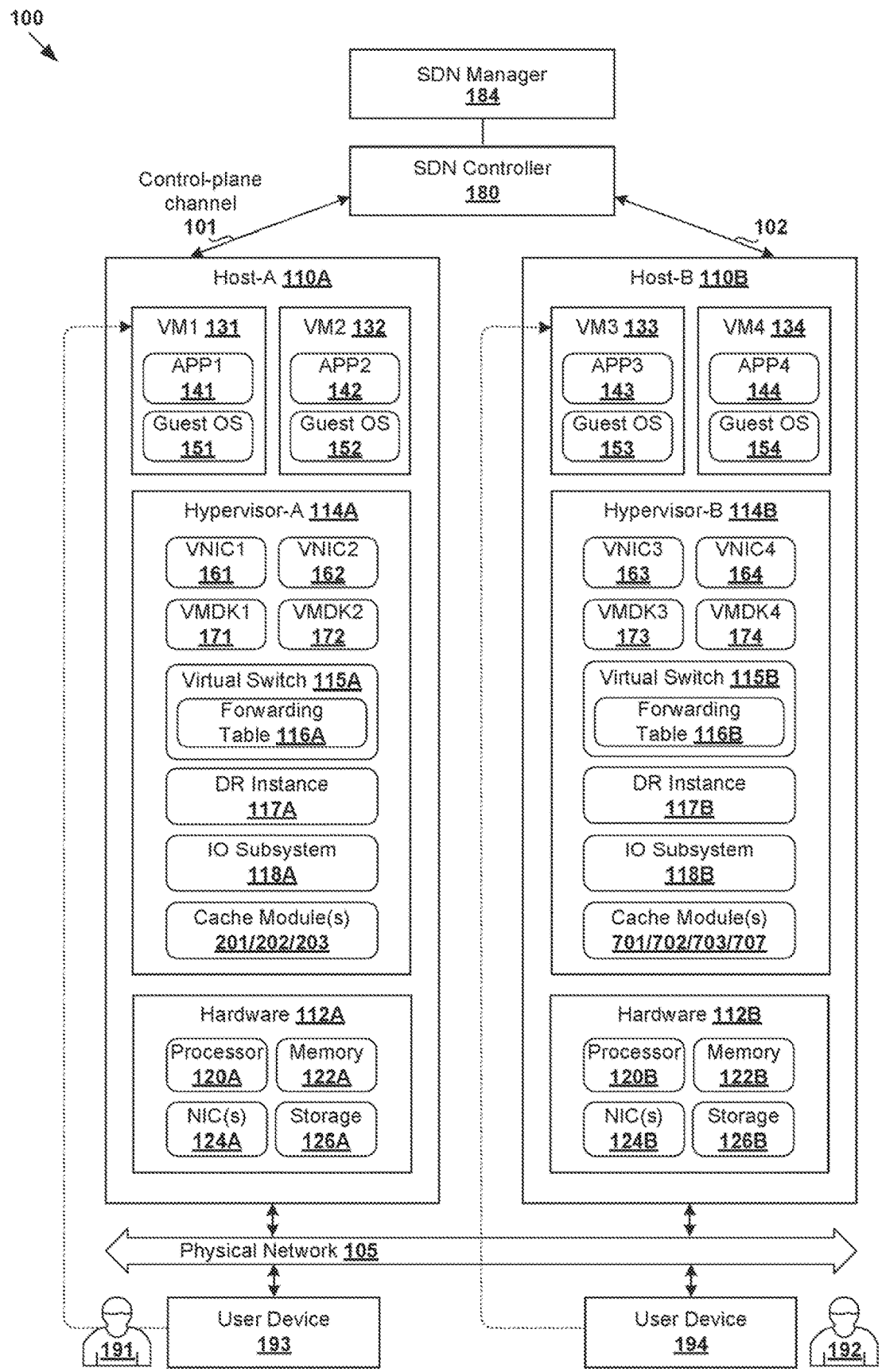
FIG. 1 is a schematic diagram illustrating an example software-defined networking (SDN) environment in which IO request handling based on tracking information may be performed.

According to examples of the present disclosure, input output (IO) request handling may be implemented in an improved manner based on tracking information. One example may involve a computer system (e.g., host-A 110A in FIG. 1) configuring, in a cache, a zero-filled logical memory page that is mappable to multiple logical block addresses of the virtual disk (e.g., VMDK1 171) allocated to a virtualized computing instance (e.g., VM1 131). In response to detecting a first IO request to perform zero writing at a logical block address of the virtual disk, the computer system may store tracking information indicating that zero writing has been issued for the logical block address.

In response to detecting a second IO request to perform a read from the virtual disk at the logical block address, the computer system may determine that that zero writing has been issued for the logical block address based on the tracking information. This way, the zero-filled logical memory page may be fetched from the cache to respond to the second IO request, thereby servicing the second IO request from the cache instead of the virtual disk. In practice, examples of the present disclosure may be implemented to improve IO throughput performance, especially for applications that perform a substantially large amount of zero writing and zero reading. Depending on the desired implementation, examples of the present disclosure may be implemented to track IO information to handle unmaps and/or zero guest writes more efficiently using a read cache (e.g., content-based read cache) in a virtualized environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Throughout the present disclosure, it should be understood that although the terms "first" and "second" are used to describe various elements, these elements should not be limited by these terms. These terms are used to distinguish one element from another. A first element may be referred to as a second element, and vice versa.

FIG. 1 is a schematic diagram illustrating example software-defined networking (SDN) environment 100 in which IO request handling based on tracking information may be performed. It should be understood that, depending on the desired implementation, SDN environment 100 may include additional and/or alternative components than that shown in FIG. 1. SDN environment 100 includes multiple hosts 110A-B that are inter-connected via physical network 105. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B may include suitable hardware 112A/112B and virtualization software (e.g., hypervisor-A 114A, hypervisor-B 114B) to support various VMs. For example, hosts 110A-B may support respective VMs 131-134. Hypervisor 114A/114B maintains a mapping between underlying hardware 112A/112B and virtual resources allocated to respective VMs. Hardware 112A/112B includes suitable physical components, such as central processing unit(s) (CPU(s)) or processor(s) 120A/120B; memory 122A/122B; physical network interface controllers (NICs) 124A/124B; and storage disk(s) 126A/126B, etc.

Virtual resources are allocated to respective VMs 131-134 to each support a guest operating system (OS); see 141-144. For example, the virtual resources may include virtual CPU(s), guest physical memory, virtual disk(s), virtual network interface controller(s) (VNIC(s)), etc. Hardware resources may be emulated using virtual machine monitors (VMMs). For example in FIG. 1, VNICs 161-164 are virtual network adapters for VMs 131-134, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address). Virtual machine virtual disks (VMDKs) 171-174 are allocated to respective VMs 131-134 to store various data required for their operations.

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports may be associated with respective VMs 131-134. Here, the term "logical port" or "logical switch port" may refer generally to a port on a logical switch to which a virtualized computing instance is connected. A "logical switch" may refer generally to an SDN construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted, and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer-2 physical networks.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown) that is configurable using SDN manager 184 operating on a management plane. Management entity 180/184 may be implemented using physical machine(s), VM(s), or both. To send or receive control information, a local control plane (LCP) agent (not shown) on host 110A/110B may interact with SDN controller 180 via control-plane channel 101/102. Hosts 110A-B may also maintain data-plane connectivity via physical network 105 to facilitate communication among VMs 131-134. Hypervisor 114A/114B may implement a virtual tunnel endpoint (VTEP) (not shown) to encapsulate and decapsulate packets.

Depending on the desired implementation, virtual desktop infrastructure (VDI) may be implemented to provide virtual desktops to remote users. For example in FIG. 1, VDI may allow remote user 191 to host a desktop OS on VM1 131 (i.e., VM-based desktop) on host-A 110A. Similarly, VDI may allow remote user 192 to host a desktop OS on VM3 133 on host-B 110B. VM 131/133 may support a "thin agent" or "guest agent" (not shown for simplicity) to capture events (e.g., login, logout, IO request, etc.) associated with VM 131/133. The agent may be configured to interact with hypervisor 114A/114B using suitable communication channel, such as a Virtual Machine Communication Interface (VMCI) channel, etc. Remote user 191/192 may access VM 131/133 using any suitable user device 193/194.

IO request handling

To facilitate various applications implemented by VMs 131-134, hypervisor 114A/114B may implement IO subsystem 118A/118B to handle IO requests associated with respective VMDKs 171-174. In practice, IO subsystem 118A/118B may be a subsystem part of hypervisor 114A/114B that includes any suitable number of module(s) to handle IO at different levels of a storage stack of hypervisor 114A/114B. Further, hypervisor 114A/114B may cache IO in memory using any suitable module(s), such as cache module(s) 201-203 (also shown in FIG. 2) on host-A 110A and cache module(s) 701-703, 707 (also shown in FIG. 7) on host-B 110B. Using content-based read cache (CBRC) as an example, the cache module(s) may be collectively referred to as "cache implementation (CBRC)." The term "module" may refer generally to a software and/or hardware component of host 110A/110B.

Using host-A 110A as an example, hypervisor-A 114A may implement IO subsystem 118A to handle IO requests from VM1 131, such as read IO requests to read data from VMDK1 171 and write IO requests to write data onto VMDK1 171. As used herein, the term "virtual disk" or "virtual storage resource" may refer generally to a file or a set of files that appears as a physical hard disk drive to a guest OS of a VM. For example, VMDK1 171 allocated to VM1 131 may emulate a physical hard disk drive (denoted as 126A) on host-A 110A. Although not shown in FIG. 1, multiple VMDKs may be allocated to one VM.

For faster access, hypervisor-A 114A may maintain a cache to store a subset of the data stored in VMDK1 171 for faster access by VM1 131. As used herein, the term "cache" may refer generally to any suitable temporary storage of data such that future requests for that data may be served faster. Throughout the present disclosure, a unit of memory in a virtual disk (e.g., VMDK1 171) may be referred to as a "logical block" having a particular logical block address (LBA). A unit of memory in a cache (e.g., cache 201) may be referred to as a "logical memory page." As such, logical block that is temporarily stored in cache 201 (e.g., 201 in FIG. 2) will be referred to as a logical memory page. Any suitable size may be configured for the logical blocks or memory pages.

Figure 2:
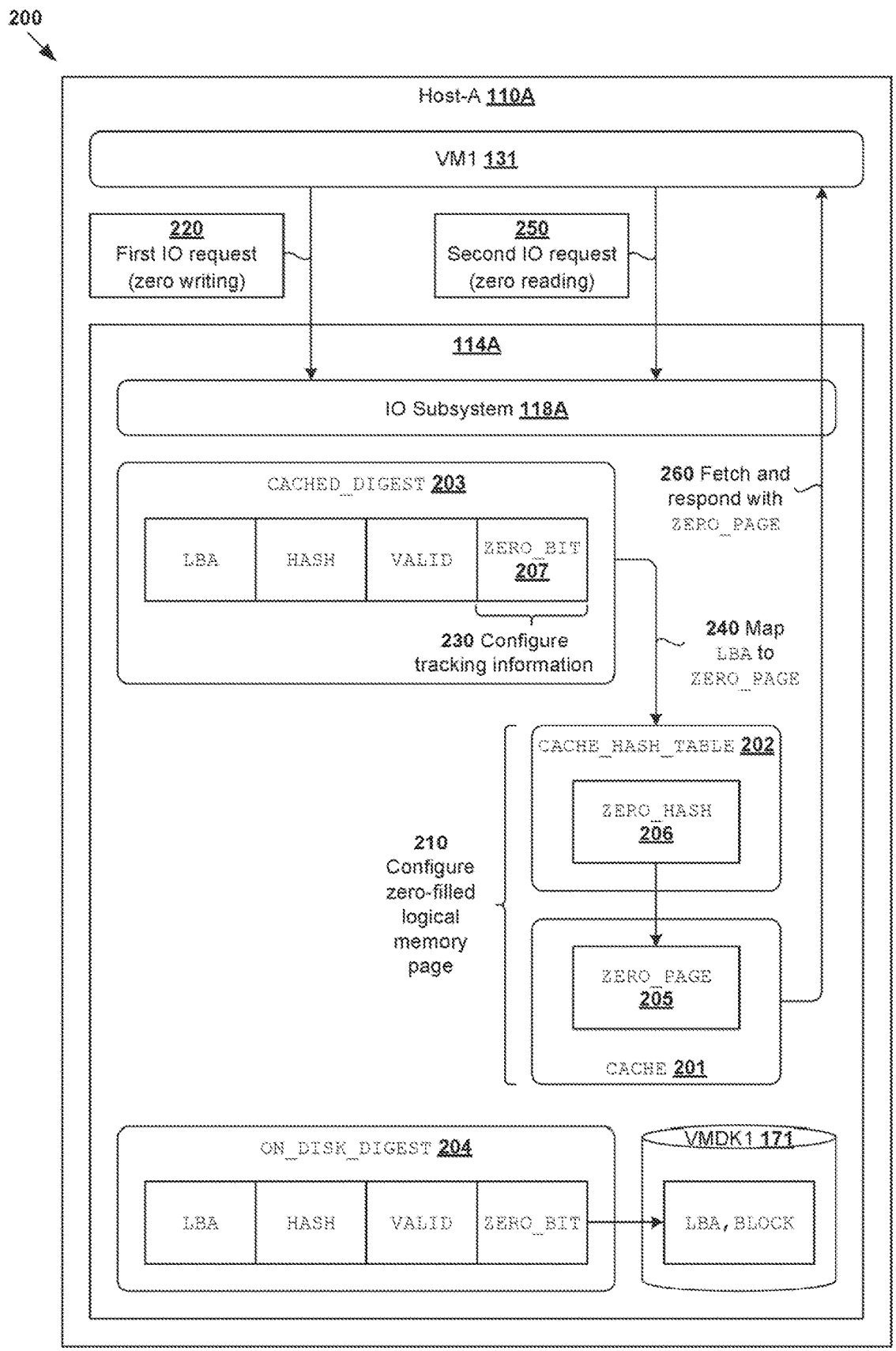
FIG. 2 is a schematic diagram illustrating an example IO request handling based on tracking information.

Example virtual disk and cache are shown in FIG. 2, which is a schematic diagram illustrating example IO request handling based on tracking information 200. Here, hypervisor-A 114A may maintain any suitable cache (see 201) in memory, such as CBRC for recognizing, handling and deduplicating VDI images, etc. In-memory cache 201 may be a dynamic cache that loads data from VMDK1 171 on demand. Data may be discarded from cache 201 according to any suitable algorithm, such as least recently used (LRU) to track what was used when and discard the least recently-used data first. In the case of CBRC, IO subsystem 118A may include any suitable CBRC module to manage CBRC.

For better look-ups, host-A 110A may maintain an in-memory hash table (see 202), in-memory or cached digest information (see 203) and on-disk digest information (see 204). In-memory or cached hash table 202 may be configured to store hash values of respective (unique) logical memory pages in cache 201. Hash table 202 may include entries with the following format: <HASH_PAGE, ADDRESS_PAGE>. Each entry is configured to store (a) HASH_PAGE=hash value of a logical memory page and (b) ADDRESS_PAGE=address of the logical memory page in cache 201. In practice, CBRC cache 201 may be configured to store unique logical memory pages.

Conventionally, digest information 203/204 may include entries with the following format: <LBA, HASH, VALID>. Each entry may be configured to store (a) LBA =an address of a logical block in VMDK1 171, (b) HASH=hash value of the logical block and (c) VALID=a bit indicating the validity of the entry. In-memory digest information 203 includes a subset of the entries of on-disk digest information 204 for faster look-up of recently-accessed blocks.

One of the challenges in SDN environment 100 is improving the IO performance associated with virtual disks, such as VMDKs 171-174. In practice, application(s) running on VMs 131-134 may issue workloads or IO requests that involve zero-filled logical blocks or buffers. Such IO requests may be used to perform deletion, initialization, or formatting of a region of a virtual disk. For example, in a VDI environment, applications running on a guest OS filesystem might consume a lot of device bandwidth to either (a) write zeroes on media virtual disk during disk initialization, or (b) read zeroes to determine whether a block is free (i.e., unused). The former is known as "zero writing" (i.e., writing zeroes) and the latter "zero reading" (i.e., reading zeroes). For simplicity, a zero-filled logical block/page may also be referred to as a zero block/page throughout the present disclosure.

Figure 3:
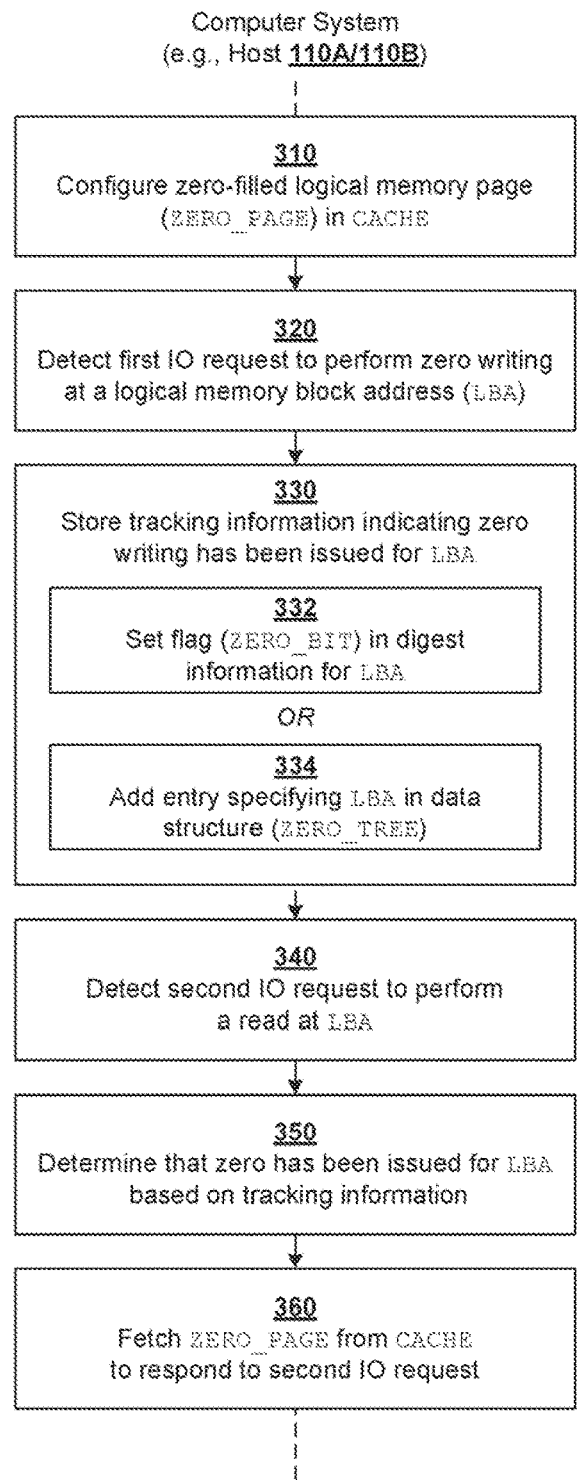
FIG. 3 is a flowchart of an example process for a computer system to perform IO request handling based on tracking information.

According to examples of the present disclosure, IO request handling may be improved to achieve better IO throughput for VMs 131-134, especially in relation to zero writing and zero reading. In the following, some examples will be explained using FIGS. 2-3. FIG. 3 is a flowchart of example process 300 for a computer system to perform IO request handling based on tracking information. Example process 300 may include one or more operations, functions, or actions illustrated by one or more blocks, such as 310 to 360. The various blocks may be combined into fewer blocks, divided into additional blocks, and/or eliminated depending on the desired implementation.

Examples of the present disclosure may be implemented using any suitable "computer system" (e.g., host 110A/110B) and "virtualized computing instance" (e.g., VM 131/132/133/134). In practice, host 110A/110B may implement IO subsystem 118A/118B to perform IO request handling according to examples of the present disclosure. IO subsystem 118A/118B may include any suitable number of software component(s) or module(s), such as a CBRC module to manage cache 201 in FIG. 2.

At 210 in FIGS. 2 and 310 in FIG. 3, host-A 110A may configure a zero-filled logical memory page in cache 201. In the example in FIG. 2, "ZERO_PAGE" (see 205) denotes an example zero-filled logical memory page that is mappable to multiple LBAs of VMDK1 171 allocated to VM1 131. Here, the term "mappable" may refer generally to a one-to-many association between the zero-filled logical memory page and multiple LBAs. In this case, the same zero-filled logical memory page may be fetched to service zero read requests for different LBAs. In practice, block 310 may further involve configuring, in hash table 202 associated with cache 201, an entry specifying <HASH_PAGE=ZERO_HASH, ADDRESS_PAGE=address of ZERO_PAGE in cache 201>. Here, "ZERO_HASH" (see 206) denotes a first hash value that maps to ZERO_PAGE 205 in cache 201. Note that if cache 201 is non-persistent, the configuration at block 310 may be repeated as required to bring ZERO_PAGE 205 in memory.

At 220-230 in FIGS. 2 and 320-330 in FIG. 3, in response to detecting a first IO request to perform zero writing at a particular LBA of VMDK1 171, host-A 110A configure or store tracking information indicating that zero writing has been issued for the LBA. Depending on the desired implementation, block 320 in FIG. 3 may involve determining whether zero writing has been issued by comparing (a) first hash value =ZERO_HASH 206 with (b) a second hash value associated with an incoming logical block to be written at the requested LBA. In this case, in response to detecting the first IO request, cached digest information 203 may be updated to associate the LBA with ZERO_HASH 206, thereby mapping the LBA to ZERO_HASH 206 in hash table 202 and ZERO_PAGE 205 in cache 201. See 240 in FIG. 2.

At 250 in FIGS. 2 and 340-350 in FIG. 3, in response to detecting a second IO request to perform a read from VMDK1 171 at the LBA, host-A 110A may determine that zero writing has been issued for the LBA based on the tracking information. This way, at 260 in FIGS. 2 and 360 in FIG. 3, host-A 110A may fetch ZERO_PAGE 205 from cache 201 to respond to the second IO request. Using examples of the present disclosure, the second IO request may be serviced from cache 201 instead of VMDK1 171 to improve IO throughput performance and IO handling efficiency.

In relation to block 330, the term "tracking information" may refer generally to any suitable information or indicator for tracking whether zero writing has been issued for a particular logical block address of a virtual disk.

(1) In a first example (see 332 in FIG. 3), a modified layout of digest information 203/204 may be configured for tracking zero writing and zero-filled logical blocks. In this case, the tracking information may be in the form of a flag in digest information 203/204 with a modified layout of <LBA, HASH, VALID, ZERO_BIT>. Here, "ZERO_BIT" (see 207 in FIG. 2) denotes a flag indicating whether zero writing has been issued for a particular LBA. In practice, the first example may be suitable for VMs that are able to use the modified layout, such as newly deployed VM1 131 on host-A 110A for which VMDK1 171 is created with the modified layout. The first example will be discussed using in FIGS. 4-5.

(2) In a second example (see 334 in FIG. 3), a data structure that is separate from digest information 203/204 may be configured for tracking zero writing and zero-filled logical blocks. In this case, the tracking information may be in the form of an entry in the data structure specifying the LBA for which zero writing has been issued. In practice, the second example may be suitable for VMs that are unable to use the modified layout above, such as VM3 133 on host-B 110B with existing VMDK3 173 and digest information. Any suitable data structure may be used, such as a tree-like structure (denoted as "ZERO_TREE"), linked list, array, file, etc. The second example will be discussed further using FIGS. 6-7.

Examples of the present disclosure may be implemented to improve IO throughput and VM performance, especially for applications that require substantially frequent zero writing and zero reading. Such applications may be configured to perform deletion, disk initialization or formatting, bootstrapping, etc. For example, IO throughput may be improved for delete-centric application workloads. Since it is not necessary to write zero blocks on VMDKs 171-174, their formatting process may be implemented more efficiently by just writing valid non-zero blocks on (e.g., CBRC-enabled) VMDKs 171-174. Further, examples of the present disclosure may be implemented to improve bootstrap operations in VDI solutions, such as by just reading non-zero blocks from VMDKs 171-174 when those blocks are not already cached in cache 201. Various examples will be discussed below.

First example: tracking using digest information

Figure 4:
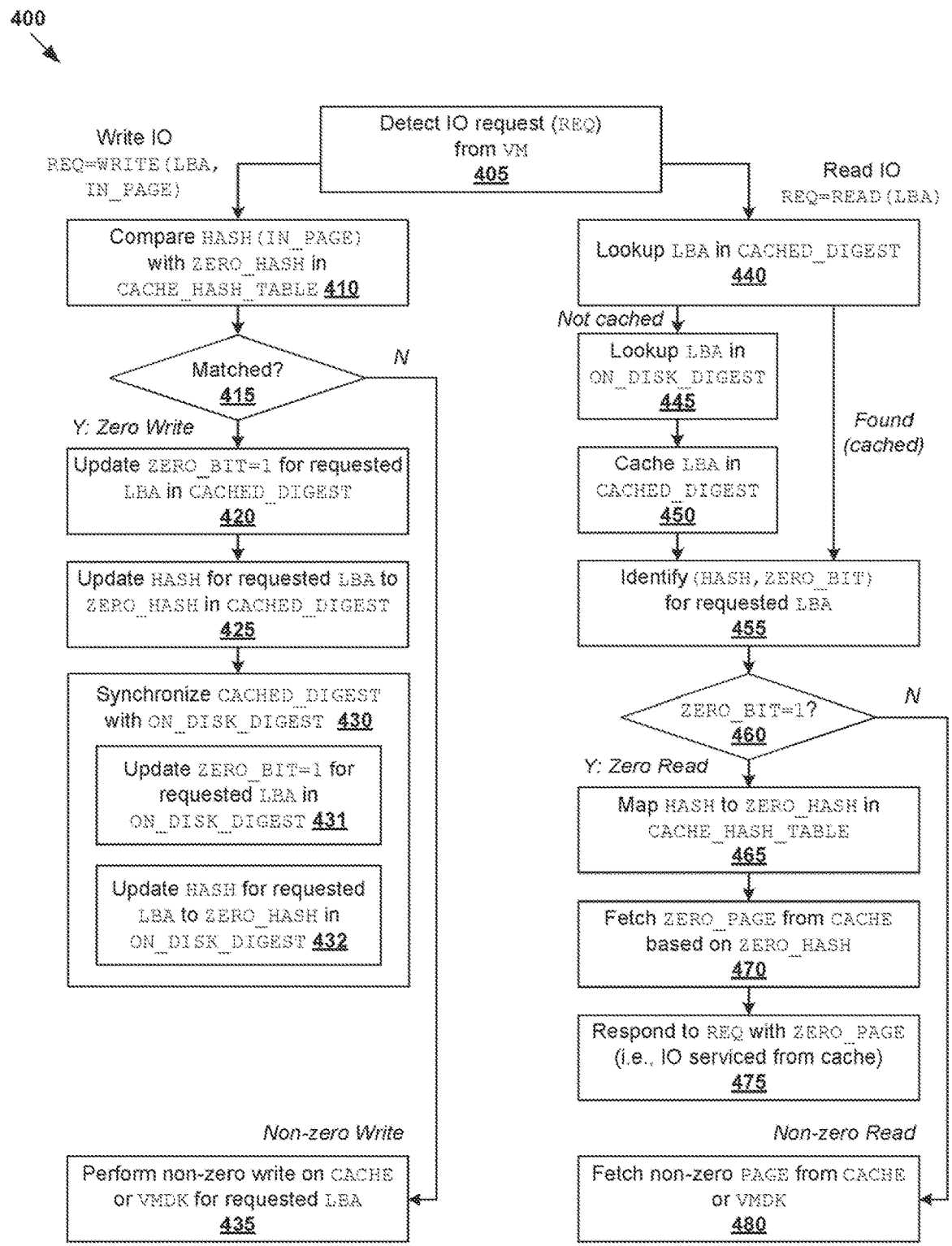
FIG. 4 is a flowchart of a first example detailed process for IO request handling based on tracking information.

FIG. 4 is a flowchart of first example detailed process 400 for IO request handling based on tracking information. Example process 400 may include one or more operations, functions, or actions illustrated at 410 to 480. The various operations, functions or actions may be combined into fewer blocks, divided into additional blocks, and/or eliminated depending on the desired implementation. FIG. 4 will be discussed using FIG. 5, which is a schematic diagram illustrating example IO request handling based on tracking information 500 according to FIG. 4. In the following, various examples will be discussed using VM1 131 and VMDK1 171 on host-A 110A. It should be understood that these examples are applicable to similar VMs on other hosts.

(a) Configuration

Figure 5:
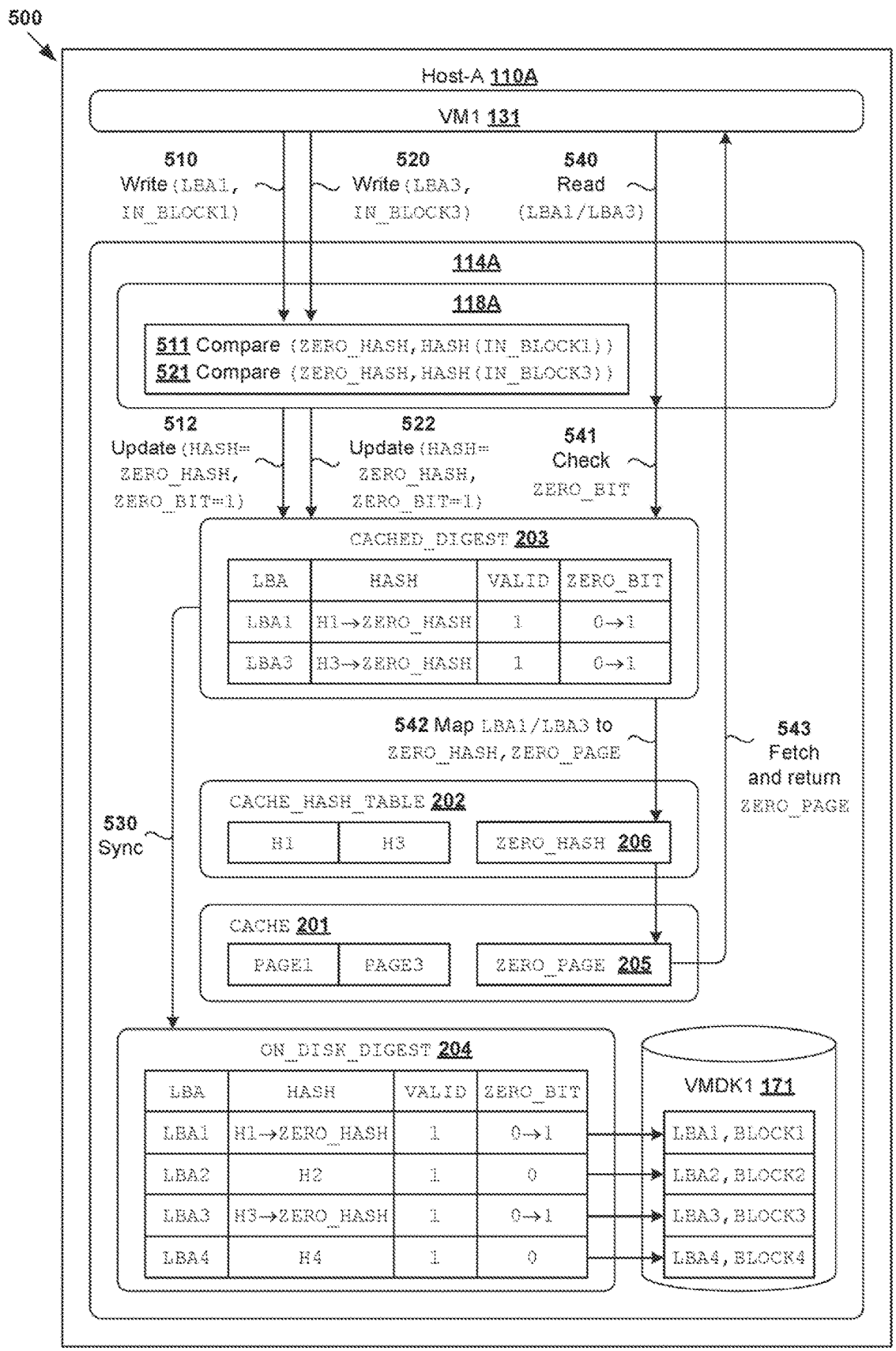
FIG. 5 is a schematic diagram illustrating example IO request handling based on tracking information according to FIG. 4.

According to the examples in FIGS. 4-5, digest information 203/204 associated with VMDK1 171 may be enhanced to include tracking information (see block 330 in FIG. 3) to track and identify zero writes. This way, based on the tracking information, zero reads and zero writes may be serviced from cache 201 instead of having to perform any on-disk operations. As shown in both FIG. 2 and FIG. 5, digest information 203/204 may be configured to include entries with a modified layout:
<LBA, HASH, VALID, ZERO_BIT>.

For a particular entry, LBA=logical block address in VMDK1 171, HASH=a hash value associated with a logical block at that LBA, and VALID=a bit indicating the validity of the entry (i.e., 1=valid, 0=invalid). Additionally, the entry includes tracking information in the form of a flag denoted as ZERO_BIT. If not set, ZERO_BIT=0 indicates a non-zero logical block/page. If set, ZERO_BIT=1 indicates a zero-filled logical block/page. During read and write IO handling, IO subsystem 118A may refer to ZERO_BIT to identify a zero block in a faster manner.

According to block 310 in FIG. 3, a zero-filled logical memory page (ZERO_PAGE) may be configured in cache 201 to facilitate IO request handling. In the example in FIG. 5, ZERO_PAGE 205 may be a reserved memory page that is pre-written or filled with zeroes. In practice, ZERO_PAGE 205 may stay pinned into cache 201 and is not evicted by a cache eviction policy (e.g., LRU). A first hash value (see ZERO_HASH 206 in FIG. 5) may also be calculated for ZERO_PAGE 205. In hash table 202, an entry may be configured to specify <HASH_PAGE=ZERO_HASH, ADDRESS_PAGE=address of ZERO_PAGE 205 configured in cache 201>.

(b) Prior to write IO request handling

In the example in FIG. 5, VMDK1 171 includes four logical blocks (see BLOCK1 to BLOCK4) associated with respective addresses (see LBA1 to LBA4). Corresponding on-disk digest information 204 includes the following entries: (LBA1, HASH=H1, VALID=1, ZERO_BIT=0), (LBA2, H2, VALID=1, ZERO_BIT=0), (LBA3, H3, VALID=1, ZERO_BIT=0), and (LBA4, H4, VALID=1, ZERO_BIT=0). Here, H1=hash value associated with a logical block at address=LBA1, H2=hash value associated with a logical block at address=LBA2, and so on. Note that ZERO_BIT=0 (i.e., none is zero-filled) prior to detecting IO requests 510-520.

Cached digest information 203 includes a subset of the entries in on-disk digest information 204: (LBA1, HASH=H1, VALID=1, ZERO_BIT=0) and (LBA3, HASH=H3, VALID=1, ZERO_BIT=0). Referring to cache 201, cached logical memory page=PAGE1 corresponds to logical block=BLOCK1 associated with address=LBA1 of VMDK1 171. Another cached logical memory page=PAGE3 corresponds to logical block=BLOCK3 associated with address=LBA3 of VMDK1 171. Associated hash values are stored in hash table 202, particularly H1 and H3 that map to respective PAGE1 and PAGE3 in cache 201.

(c) Write IO request handling

Referring to FIG. 4, at 405, IO subsystem 118A may detect a write IO request and perform a write workflow according to blocks 410-435. A write IO request may be represented in the form of WRITE(LBA, IN_BLOCK), where LBA=logical block address for which the write IO is requested and IN_BLOCK=incoming logical block to be written at that address on VMDK1 171. In other words, the content of the requested LBA will be replaced by IN_BLOCK after the write IO request is serviced.

At 410-415 in FIG. 4, in response to detecting a write IO request from VM1 131 on host-A 110A, IO subsystem 118A may determine whether zero writing is required. The determination at block 410 may involve comparing (a) HASH (IN_BLOCK) =hash value associated with the incoming block with (b) ZERO_HASH=hash value of ZERO_PAGE in hash table 202. If not matched (no at 415), zero writing is not required, and the non-zero write IO request may be serviced using cache 201 (if cached) or VMDK1 171 (not cached) according to any suitable approach at 435.

Otherwise, if matched (yes at 415), a zero-writing workflow may be performed according to examples of the present disclosure. In particular, at 420-425, in response to determination that zero writing is required, IO subsystem 118A may store tracking information to indicate that zero writing has been issued for the requested LBA. This may involve updating cached digest information 203 to set ZERO_BIT=1 and specify HASH=ZERO_HASH 206 for the requested LBA.

At 430 in FIG. 4, synchronization may be performed, such as in an asynchronous manner according to any desired frequency. Based on cached digest information 203, the synchronization is performed to update on-disk digest information 204 by setting ZERO_BIT=1 and HASH=ZERO_HASH 206 for the requested LBA.

Two write IO requests to delete non-zero blocks are shown in FIG. 5. In a first example (see 510-512), VM1 131 may issue a first write IO request=WRITE(LBA1, IN_BLOCK1) to delete a logical block at LBA1 on VMDK1 171. In response, IO subsystem 118A may compare HASH (IN_BLOCK1) with ZERO_HASH 206 to determine whether zero writing is required. Since there is a match, cached digest information 203 is updated from (LBA1, HASH=H1, VALID=1, ZERO_BIT=0) to (LBA1, HASH=ZERO_HASH, VALID=1, ZERO_BIT=1). During synchronization (see 530), on-disk digest information 204 is updated based on cached digest information 203.

In a second example (see 520-522 in FIG. 5), VM1 131 may issue a second write IO request in the form of WRITE (LBA3, IN_BLOCK2) to initialize or format a memory block at LBA3 on VMDK1 171. In response, IO subsystem 118A may match HASH(IN_BLOCK2) with ZERO_HASH 206 to determine that zero writing is required. Since there is a match, cached digest information 203 is updated from (LBA3, HASH=H3, VALID=1, ZERO_BIT=0) to (LBA3, HASH=ZERO_HASH, VALID=1, ZERO_BIT=1). Similarly, during synchronization (see 530), on-disk digest information 204 is also updated.

(d) Read IO request handling

At 405 and 440 in FIG. 4, in response to detecting a read IO request from VM1 131, IO subsystem 118A may perform a look-up to determine whether the requested LBA has been cached in cached digest information 203. At 445, if not cached, another look-up may be performed to search for the requested LBA in on-disk digest information 204. Next, at 450, cached digest information 203 is updated to include the requested LBA for faster subsequent access.

At 455 in FIG. 4, IO subsystem 118A may determine whether zero writing has been performed or issued for the requested LBA based on corresponding tracking information ZERO_BIT. In the case of ZERO_BIT=0, the read IO request may be serviced by fetching a non-zero memory page from cache 201 or non-zero memory block from VMDK1 171 at 480. Otherwise (ZERO_BIT=1), at 460-465, IO subsystem 118A may identify that HASH=ZERO_HASH for the requested LBA. This way, at 470-475, IO subsystem 118A may fetch a zero-filled logical memory page (i.e., ZERO_PAGE 205) from cache 201 to respond to the read IO request.

Referring to the example in FIG. 5 again, VM1 131 may issue a first read IO request=READ(LBA1) to read a logical block at LBA1 on VMDK1 171. In response, IO subsystem 118A may identify (LBA1, ZERO_BIT=1) from cached digest information 203 to determine that zero writing has been issued for LBA1. As such, IO subsystem 118A may map (LBA1, ZERO_HASH) in cached digest information 203 to (ZERO_HASH 206, ZERO_PAGE 205) in respective hash table 202 and cache 201. This way, the read IO request may be serviced from cache 201 instead of VMDK1 171. See 541, 542 and 543 in FIG. 5.

In a second example (not shown in FIG. 5 for simplicity), VM1 131 may issue a second read IO request in the form of READ(LBA3). In response, IO subsystem 118A may identify (LBA3, ZERO_BIT=1) from cached digest information 203 to determine that zero writing has been issued for LBA3. IO subsystem 118A may then map (LBA3, ZERO_HASH) in cached digest information 203 to (ZERO_HASH 206, ZERO_PAGE 205). Once again, the read IO request may be serviced from cache 201.

Second example: tracking using data structure

Figure 6:
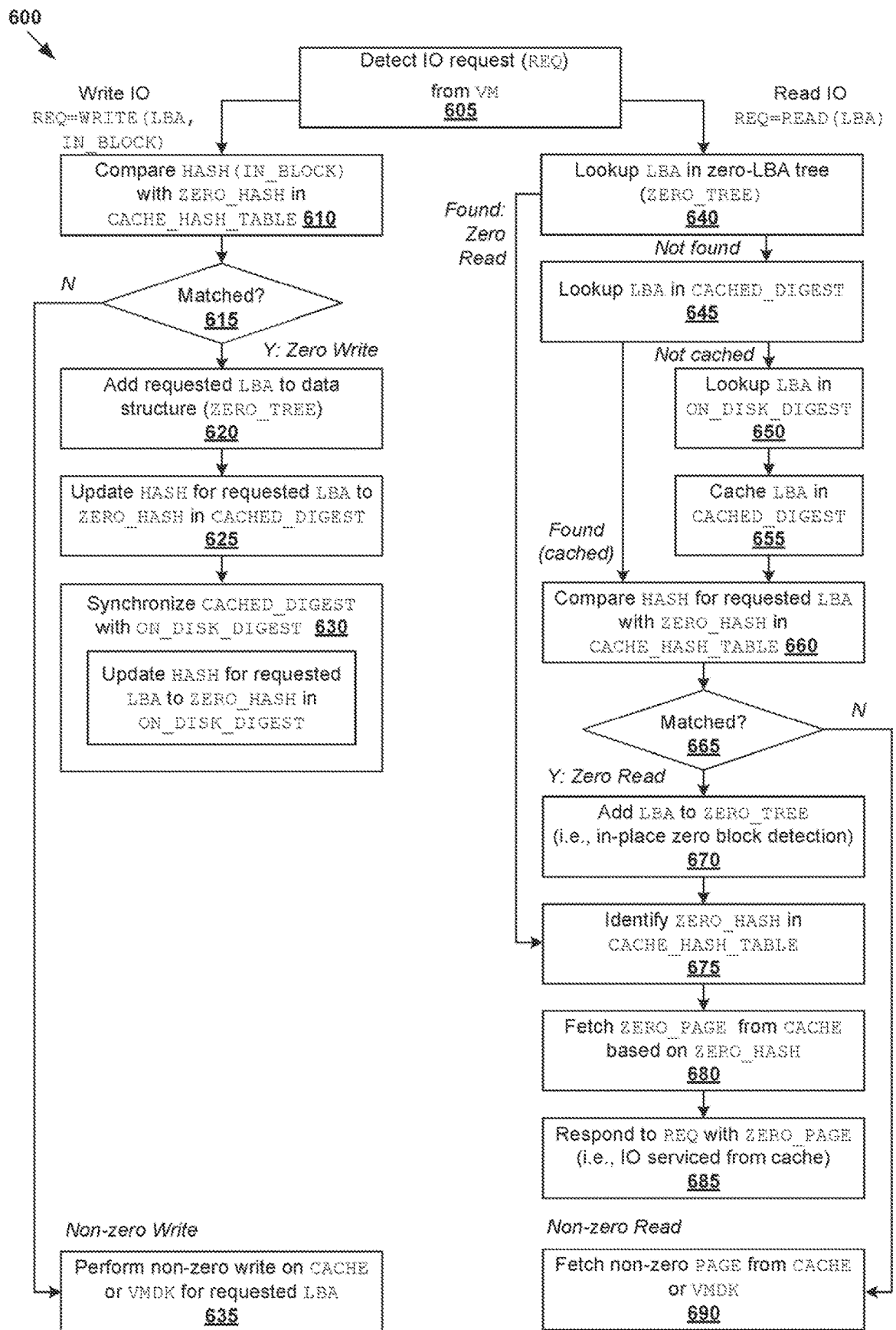
FIG. 6 is a schematic diagram illustrating a second example detailed process for IO request handling based on tracking information.
Figure 7:
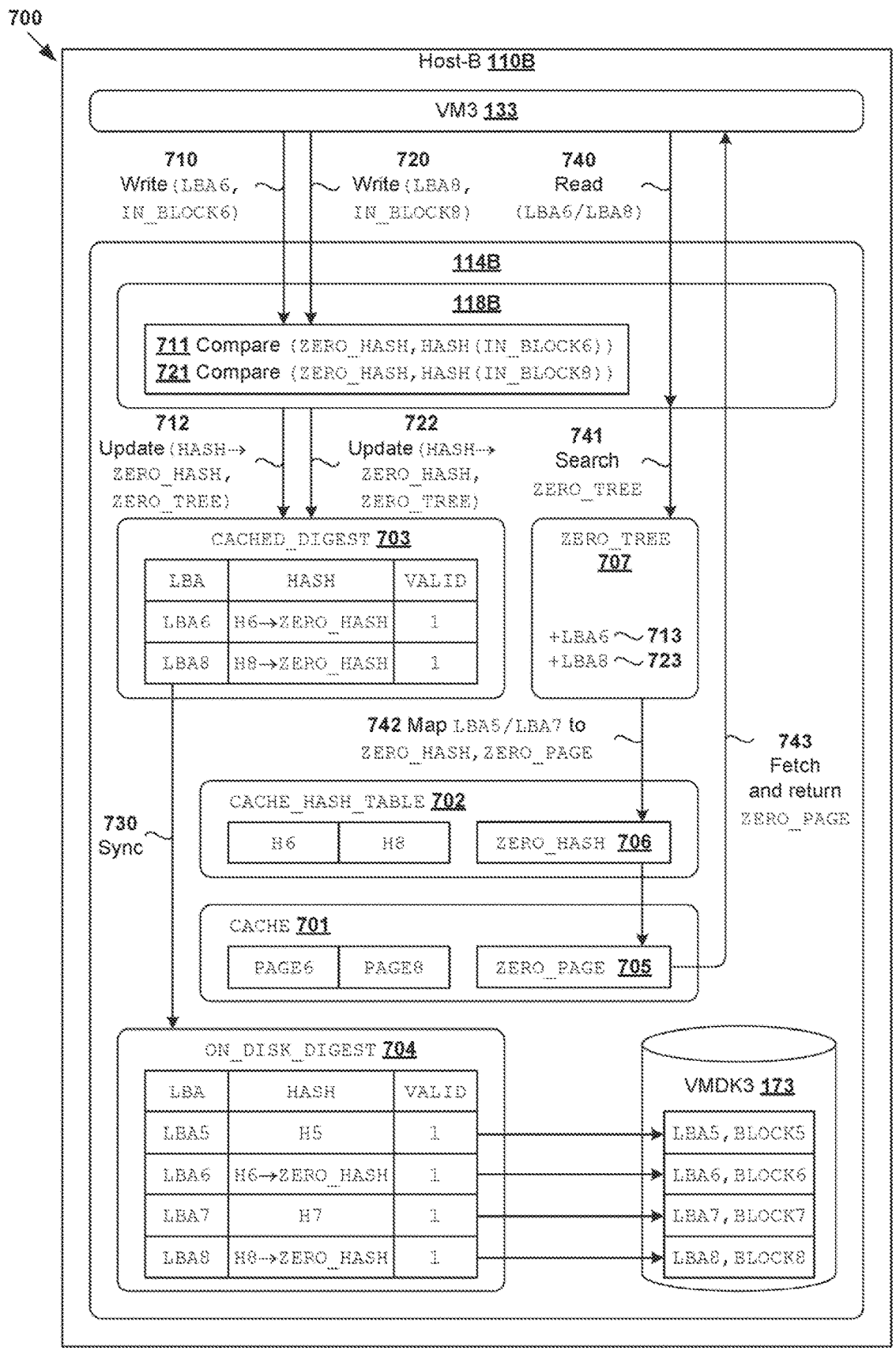
FIG. 7 is a schematic diagram illustrating example IO request handling based on tracking information according to FIG. 6.

According to examples of the present disclosure, zero writing may also be tracked without any layout modification to existing digest information 203-204. Instead, a separate data structure may be configured to store LBA(s) for which zero writing has been issued. In more detail, FIG. 6 is a flowchart of second example detailed process 600 for IO request handling based on tracking information. Example process 600 may include one or more operations, functions, or actions illustrated at 610 to 690. The various operations, functions or actions may be combined into fewer blocks, divided into additional blocks, and/or eliminated depending on the desired implementation. FIG. 7 is a schematic diagram illustrating second example 700 of IO request handling based on tracking information.

(a) Configuration

The examples in FIGS. 6-7 may be implemented for deployed VMs with existing VMDKs, such as VM3 133 allocated with VMDK3 173 on host-B 110B in FIG. 7. In this case, VM3 133 may be migrated from a source host (not shown) to destination host-B 110B on which zero writing detection is enabled. Also, VMDK3 173 may already have existing zero-filled blocks stored. On enablement of zero-writing detection for VM3 133 on host-B 110B, the following configuration steps may be performed:

(1) IO subsystem 118B may configure a data structure to store tracking information specifying LBAs and corresponding zero-filled logical blocks on VMDK3 173. Any suitable "data structure" capable of storing LBAs may be configured, such as a tree-like structure, linked list, array, file, etc. For example in FIG. 7, ZERO_TREE 707 may be a file (e.g., on-disk file) that is configured to store LBAs in a serialized form. For simplicity, ZERO_TREE 707 may be a binary search tree with each node having two children. In this case, each parent node may store an LBA. The value of a left child node is less than the value of the parent node, while the value of a right child node is greater than the value of the parent node. In practice, the data structure may be configured to store unique LBAs (i.e., no duplicates) and cached in memory for faster look-ups.

(2) IO subsystem 118B may implement a digest scanner to perform a scan to search for zero-filled logical blocks on VMDK3 173. This is to scan digest information 703/704 to identify zero-filled memory blocks on VMDK3 173 by detecting valid pre-existing hash entries of those zero blocks. In practice, the scan may run in background while VM3 133 is in use and continues to issue IO requests. If a zero block is detected on VMDK3 173 but the scan has not traversed that block, its LBA may be added or inserted into ZERO_TREE 707. The digest scanner may traverse digest information 703/704 once to search for and add each LBA with an existing zero-filled block to ZERO_TREE 707.

(3) IO subsystem 118B may configure ZERO_PAGE 205 in cache 201 and ZERO_HASH 206 in hash table 702. Further, host-B 110B may maintain cache 701, hash table 702, as well as cached digest information 703 and on-disk digest information 704. Digest information 703-704 may have the format of <LBA, HASH, VALID>. Unlike the examples in FIGS. 4-5, it is not necessary to modify digest information 703-704 to include ZERO_BIT for tracking purposes.

(b) Prior to write IO request handling

In the example in FIG. 7, VMDK3 173 includes four logical blocks (see BLOCK5 to BLOCK8) associated with respective addresses (see LBA5 to LBA8). On-disk digest information 704 includes the following entries: (LBA5, HASH=H5, VALID=1), (LBA6, H6, VALID=1), (LBA7, H7, VALID=1) and (LBA8, H8, VALID=1). Here, H5=hash value associated with a logical block at address=LBA5, H6=hash value associated with a logical block at address=LBA6, and so on.

Cached digest information 703 includes a subset of the entries in on-disk digest information 704, including (LBA6, H6, VALID=1) and (LBA8, H8, VALID=1). Referring to cache 701, cached logical memory page=PAGE6 corresponds to logical block=BLOCK6 at LBA6 of VMDK3 173. Another cached logical memory page=PAGE8 corresponds to BLOCK8 at LBA8 of VMDK3 173. Corresponding hash values are stored in hash table 702, particularly H6 and H6 that map to respective PAGE6 and PAGE8 in cache 701.

(c) Write IO request handling

At 605 in FIG. 6, IO subsystem 118B may detect a write IO request and perform a write workflow according to blocks 610-635. Similar to the examples in FIGS. 4-5, a write IO request=WRITE(LBA, IN_BLOCK), where LBA=logical block address on VMDK3 173 and IN_BLOCK=incoming memory block to be written at that address.

At 610-615 in FIG. 6, in response to detecting a write IO request from VM3 133, IO subsystem 118B may determine whether zero writing is required. This may involve comparing (a) HASH(IN_BLOCK)=hash value associated with the incoming logical block and (b) ZERO_HASH=hash value of ZERO_PAGE 705. If not matched, zero writing is not required, and the non-zero write IO request may be serviced using cache 701 (if cached) or VMDK3 173 (not cached) at 635.

Otherwise, if matched (yes at 615 in FIG. 6), a zero-writing workflow may be performed. In particular, at 620, in response to determination that zero writing is required, IO subsystem 118B may store tracking information indicating that a zero writing request has been issued for the requested LBA. This may involve updating ZERO_TREE 707 to add the requested LBA. Further, at 620, cached digest information 703 may be updated to replace HASH for that LBA with ZERO_HASH 706.

At 630 in FIG. 6, synchronization may be performed, such as in an asynchronous manner according to any desired frequency. Based on cached digest information 703, the synchronization is performed to update on-disk digest information 704 by setting HASH=ZERO_HASH 706 for the requested LBA.

Two example requests to delete non-zero blocks are shown in FIG. 7. In a first example (see 710-712), VM3 133 may issue a first write IO request=WRITE(LBA6, IN_BLOCK6) to delete a logical block at LBA6 on VMDK3 173. In response, IO subsystem 118B may compare HASH (IN_BLOCK6) with ZERO_HASH 706 to determine whether zero writing is required. Since there is a match, cached digest information 703 for LBA6 is updated to replace HASH=H6 with HASH=ZERO_HASH 706. Tracking information in the form of entry specifying LBA6 is added to ZERO_TREE 707 (see 713). During synchronization (see 730), on-disk digest information 704 is updated based on cached digest information 703.

In a second example (see 720-722), VM3 133 may issue a second write IO request=WRITE(LBA8, IN_BLOCK8) to initialize or format a memory block at LBA8 on VMDK3 173. In response, IO subsystem 118B may match HASH (IN_BLOCK8) with ZERO_HASH 706 to determine that zero writing is required. Since there is a match, cached digest information 703 is updated to replace (LBA8, HASH=H8) with (LBA8, HASH=ZERO_HASH). Tracking information in the form of entry specifying LBA8 is also added to ZERO_TREE 707 (see 723). Similarly, during synchronization (see 730), on-disk digest information 704 is updated accordingly.

(d) Read IO request handling

At 605 and 640 in FIG. 6, in response to detecting a read IO request from VM3 133, IO subsystem 118B may perform a look-up based on tracking information stored in ZERO_TREE 707. This is to determine whether the data structure includes the requested LBA, which in turn indicates whether zero writing has been issued.

At 675 in FIG. 6, in response to determination that zero writing has been issued based on ZERO_TREE 707,10 subsystem 118B may identify that HASH=ZERO_HASH 706 for the requested LBA from cached digest information 703. This way, the requested LBA may be mapped to ZERO_HASH 706 in hash table 702. At 680-685, based on ZERO_HASH 706, ZERO_PAGE 705 may be fetched from cache 701 to respond to the read IO request.

Referring to FIG. 7 again, VM3 133 may issue a read IO request=READ(LBA6) to read a logical block at LBA6 on VMDK3 173. In response, IO subsystem 118B may search ZERO_TREE 707 to find LBA6. In this case, it is determined that zero writing has been issued for LBA6 and zero reading is required. As such, IO subsystem 118B may map (LBA6, ZERO_HASH) in cached digest information 703 to (ZERO_HASH 706, ZERO_PAGE 705). This way, the read IO request may be serviced from cache 701 instead of VMDK3 173. See 741, 742 and 743 in FIG. 7.

In a second example (not shown in FIG. 7 for simplicity), VM3 133 may issue a subsequent read IO request=READ (LBA8). In response, IO subsystem 118B may search ZERO_TREE 707 to find LBA8. In this case, it is determined zero reading is required. As such, IO subsystem 118B may map (LBA8, ZERO_HASH) in cached digest information 703 to (ZERO_HASH 706, ZERO_PAGE 705). This way, the read IO request may be serviced from cache 701 instead of VMDK3 173.

(e) In-place detection

Depending on the desired implementation, in-place detection of zero-filled logical blocks on VMDK3 173 may be implemented according to blocks 645-670 in FIG. 6. This may occur when digest information scanning has not been completed. In this case, although a particular LBA is associated with a zero-filled logical block, that LBA may not be found in ZERO_TREE 707 at block 7.

In more detail, in response to determination that a requested LBA is not found in ZERO_TREE 707 (see 645 in FIG. 6), 10 subsystem 118B may perform a second look-up to determine whether the requested LBA has been cached in cached digest information 703. If not cached (see 650), a third look-up may be performed to search for the requested LBA in on-disk digest information 704. Next, at 655, cached digest information 703 is updated to include the requested LBA for faster servicing of future requests associated with the same LBA.

Next (see 660-665 in FIG. 6), it is determined whether zero reading is required for the requested LBA. First, at 660, IO subsystem 118B may compare (a) HASH=hash value of a logical block at the requested LBA with (b) ZERO_HASH 706 in hash table 702. If not matched (see 665), it is determined that the logical block to be read is a non-zero block. In this case (see 690), the read IO request may be serviced by fetching a non-zero logical memory page from cache 701 or non-zero logical block from VMDK3 173 according to any suitable approach.

Otherwise (see 670 in FIG. 6), a match with ZERO_HASH 706 indicates that the logical block to be read is a zero block. In-place detection is then completed by adding the requested LBA to ZERO_TREE 707. In practice, the in-place detection may be performed along with digest information scan(s) of VMDK3 173.

At 675 in FIG. 6, in response to determination that a zero read is required, IO subsystem 118B may identify entry (LBA, HASH=ZERO_HASH) in cached digest information 703 before mapping the LBA to ZERO_HASH 706 in hash table 702. This way, at 680-685, IO subsystem 118B may fetch ZERO_PAGE 705 from cache 701 to respond to the read IO request.

Using the example in FIG. 7, LBA5 may be associated with an existing zero-filled logical block (i.e., BLOCK5) but is not found ZERO_TREE 707. In this case, in response to detecting a read IO request for address=LBA5, IO subsystem 118B may perform in-place detection by adding LBA5 to ZERO_TREE 707. ZERO_PAGE 705 is then fetched to respond to the request, thereby servicing the request from cache 701 instead of VMDK3 173 to achieve better IO throughput.

Container implementation

Although explained using VMs 131-134, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-134. Containers are "OS-less", meaning that they do not include any OS that could weigh 10s of Gigabytes (GB). This makes containers more lightweight, portable, efficient, and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer system

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as host 110A/110B may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a computer system to perform input output (IO) request handling based on tracking information, wherein the method comprises:
    configuring, in a cache, a zero-filled logical memory page that is mappable to multiple logical block addresses of a virtual disk allocated to a virtualized computing instance;
    in response to detecting, from the virtualized computing instance, a first IO request to perform zero writing at a logical block address of the virtual disk, storing tracking information indicating that zero writing has been issued for the logical block address; and
    in response to detecting a second IO request to perform a read from the virtual disk at the logical block address,
        based on the tracking information, determining that that zero writing has been issued for the logical block address; and
        fetching the zero-filled logical memory page from the cache to respond to the second IO request, thereby servicing the second IO request from the cache instead of the virtual disk.

2. The method of claim 1, wherein configuring the zero-filled logical memory page comprises:
    configuring, in a hash table associated with the cache, a first hash value associated with the zero-filled logical memory page of the cache.

3. The method of claim 2, wherein the method further comprises:
    in response to detecting the first IO request, updating digest information associated with the virtual disk to map (a) the logical block address to (b) the first hash value associated with the zero-filled logical memory page.

4. The method of claim 2, wherein detecting the first IO request comprises:
    determining whether zero writing has been issued by comparing (a) the first hash value with (b) a second hash value associated with an incoming logical block to be written at the logical block address of the virtual disk.

5. The method of claim 1, wherein storing the tracking information comprises:
    storing the tracking information by setting a flag in digest information associated with the logical block address, wherein the flag is set to indicate that zero writing has been issued.

6. The method of claim 1, wherein storing the tracking information comprises:
    storing the tracking information by adding an entry into a data structure that is separate from digest information associated with the logical block address, wherein the entry specifies the logical block address for which zero writing has been issued.

7. The method of claim 6, wherein the method further comprises:
    detecting a third IO request to perform a read from the virtual disk at a further logical block address that is not found in the data structure; and
    in response to determination that zero reading is required, performing in-place detection by adding the further logical block address to the data structure.

8. A non-transitory computer-readable storage medium that includes a set of instructions which, in response to execution by a processor of a computer system, cause the processor to perform input output (IO) request handling based on tracking information, wherein the method comprises:
    configuring, in a cache, a zero-filled logical memory page that is mappable to multiple logical block addresses of a virtual disk allocated to a virtualized computing instance;
    in response to detecting, from the virtualized computing instance, a first IO request to perform zero writing at a logical block address of the virtual disk, storing tracking information indicating that zero writing has been issued for the logical block address; and
    in response to detecting a second IO request to perform a read from the virtual disk at the logical block address,
        based on the tracking information, determining that that zero writing has been issued for the logical block address; and
        fetching the zero-filled logical memory page from the cache to respond to the second IO request, thereby servicing the second IO request from the cache instead of the virtual disk.

9. The non-transitory computer-readable storage medium of claim 8, wherein configuring the zero-filled logical memory page comprises:
    configuring, in a hash table associated with the cache, a first hash value associated with the zero-filled logical memory page of the cache.

10. The non-transitory computer-readable storage medium of claim 9, wherein the method further comprises:
    in response to detecting the first IO request, updating digest information associated with the virtual disk to map (a) the logical block address to (b) the first hash value associated with the zero-filled logical memory page.

11. The non-transitory computer-readable storage medium of claim 9, wherein detecting the first IO request comprises:
    determining whether zero writing has been issued by comparing (a) the first hash value with (b) a second hash value associated with an incoming logical block to be written at the logical block address of the virtual disk.

12. The non-transitory computer-readable storage medium of claim 8, wherein storing the tracking information comprises:
    storing the tracking information by setting a flag in digest information associated with the logical block address, wherein the flag is set to indicate that zero writing has been issued.

13. The non-transitory computer-readable storage medium of claim 8, wherein storing the tracking information comprises:
    storing the tracking information by adding an entry into a data structure that is separate from digest information associated with the logical block address, wherein the entry specifies the logical block address for which zero writing has been issued.

14. The non-transitory computer-readable storage medium of claim 13, wherein the method further comprises:

detecting a third IO request to perform a read from the virtual disk at a further logical block address that is not found in the data structure; and in response to determination that zero reading is required, performing in-place detection by adding the further logical block address to the data structure.

15. A computer system, comprising:
(a) a cache;
(b) a virtual disk allocated to a virtualized computing instance; and
(c) an input output (IO) subsystem to perform the following:
configure, in the cache, a zero-filled logical memory page that is mappable to multiple logical block addresses of the virtual disk;

in response to detecting, from the virtualized computing instance, a first IO request to perform zero writing at a logical block address of the virtual disk, store tracking information indicating that zero writing has been issued for the logical block address; and in response to detecting a second IO request to perform a read from the virtual disk at the logical block address,
based on the tracking information, determine that that zero writing has been issued for the logical block address; and
fetch the zero-filled logical memory page from the cache to respond to the second IO request, thereby servicing the second IO request from the cache instead of the virtual disk.

16. The computer system of claim 15, wherein the IO subsystem is to configure the zero-filled logical memory page comprises by performing the following:
configure, in a hash table associated with the cache, a first hash value associated with the zero-filled logical memory page of the cache.

17. The computer system of claim 16, wherein the IO subsystem is further to perform the following:
in response to detecting the first IO request, update digest information associated with the virtual disk to map (a) the logical block address to (b) the first hash value associated with the zero-filled logical memory page.

18. The computer system of claim 16, wherein the IO subsystem is to detect the first IO request comprises by performing the following:
determine whether zero writing has been issued by comparing (a) the first hash value with (b) a second hash value associated with an incoming logical block to be written at the logical block address of the virtual disk.

19. The computer system of claim 15, wherein the IO subsystem is to store the tracking information by performing the following:
set a flag in digest information associated with the logical block address, wherein the flag is set to indicate that zero writing has been issued.

20. The computer system of claim 15, wherein the IO subsystem is to store the tracking information by performing the following:
add an entry into a data structure that is separate from digest information associated with the logical block address, wherein the entry specifies the logical block address for which zero writing has been issued.

21. The computer system of claim 20, wherein the IO subsystem is further to perform the following:
detect a third IO request to perform a read from the virtual disk at a further logical block address that is not found in the data structure; and
in response to determination that zero reading is required, perform in-place detection by adding the further logical block address to the data structure.

* * * * *